United States Patent
Hanna et al.

[11] Patent Number: 5,282,972
[45] Date of Patent: Feb. 1, 1994

[54] METHOD AND APPARATUS FOR RECYCLING R/O WASTE WATER

[75] Inventors: Milad M. Hanna; Jerome Y. Fridman, both of Scottsdale, Ariz.

[73] Assignee: Kelco Water Engineering, Inc., Yuma, Ariz.

[21] Appl. No.: 809,309

[22] Filed: Dec. 18, 1991

[51] Int. Cl.⁵ .............................................. B01D 61/00
[52] U.S. Cl. ................................. 210/652; 210/195.2; 210/257.2; 210/254; 210/805; 210/97; 210/137
[58] Field of Search ............... 210/652, 195.2, 295, 210/137, 254, 257.2, 134, 651, 259, 98, 97, 805

[56] References Cited
U.S. PATENT DOCUMENTS

| | | | |
|---|---|---|---|
| 3,528,901 | 9/1970 | Wallace et al. | 210/652 |
| 3,856,676 | 12/1974 | Grimme, Jr. et al. | 210/259 |
| 4,125,463 | 11/1978 | Chenoweth | 210/652 |
| 4,678,477 | 7/1987 | The et al. | 210/652 |
| 4,773,991 | 9/1988 | Aid | 210/195.2 |
| 4,784,763 | 11/1988 | Hambleton et al. | 210/195.2 |
| 4,885,085 | 12/1989 | Beall, Jr. | 210/195.2 |
| 4,909,934 | 3/1990 | Brown et al. | 210/257.2 |
| 4,978,505 | 12/1990 | Menon et al. | 210/257.2 |
| 5,006,234 | 4/1991 | Menon et al. | 210/98 |
| 5,076,913 | 12/1991 | Miller et al. | 210/195.2 |
| 5,132,015 | 7/1992 | Down | 210/637 |
| 5,160,608 | 11/1992 | Norton | 210/134 |

Primary Examiner—Robert A. Dawson
Assistant Examiner—Ana M. Fortuna
Attorney, Agent, or Firm—Cahill, Sutton & Thomas

[57] ABSTRACT

Waste water discharged from a reverse osmosis unit served by a water feed line and producing potable water is returned to the water feed line for water conservation purposes. After periodic flushing of the reverse osmosis unit, the flush water may be returned to the water feed line or channelled to a drain. After each cycle of operation, any pressure differential between the water inflowing to and water outflowing from the reverse osmosis unit is relieved.

23 Claims, 5 Drawing Sheets

METHOD AND APPARATUS FOR RECYCLING R/O WASTE WATER

BACKGROUND OF THE INVENTION

1. Field of the Invention

The present invention relates to water treatment and recycling apparatus and, more particularly, to apparatus for recycling concentrate water from a reverse osmosis water purification unit.

2. Background of the Invention

Reverse osmosis (R/O) units have been used for years to obtain near pure water for human consumption and other uses. These units are often located on the premises of businesses and residences to serve potable water needs. The operation of an R/O unit is well known. Generally, one or more filters are located upstream to remove particulate matter of a size corresponding to five microns or more. The filtered water may be passed through an activated carbon filter to reduce the presence of chlorine, THM's, TCE, pesticides and other harmful and foul tasting chemicals.

The filtered water is introduced to one side of a semipermeable membrane under pressure. The water flowing through the membrane is effectively filtered by restricting passage of particles therethrough of a size down to 1/10,000 of a micron. This filtration will remove 99.99% of bacteria, viruses, cysts and pyrogens. Up to approximately 98% of various metals and chemicals commonly found in city water, as well as in water from natural springs, are removed. The filtered water is referred to as the permeate and the water containing the filtered elements is referred to as the concentrate. Representative R/O units are available from Kelco Water Engineering, Inc. of Tempe, Ariz. and include model numbers RO-TFC-MS, RO-TFC-MX3, RO-TFC-LPP, RO-CTA-MS, and RO-CTA-LPP.

During filtration, the water on the upstream side of the membrane, including particulate matter removed from the water passing through the membrane, is discharged. Thus, this water has a higher concentration of particulate and other matter than the water entering the R/O unit. In practice, two to three times as much water is discharged from the upstream side of the filter as is filtered. Because the filter has a very low porosity in order to effectively serve its filtering function, the production of 15 gallons per day at conventional city water pressure is the norm. This translates into approximately 45 gallons of water per day that is discarded into the drain or sewage system. Periodically, the upstream side of the manifold adjacent the membrane may be flushed to remove the filtered particles, etc. The flush water is generally conveyed to a drain and becomes part of the waste water of the business, residence or other place of use.

The ever present need and desire for essentially pure water for potable purposes must be balanced with the quantity of waste water produced by conventional R/O units. Where water is at a premium in terms of availability, a user may have to forego water treated by an R/O unit in favor of water conservation.

SUMMARY OF THE INVENTION

The water containing the concentrate of impurities resulting from use of a conventional reverse osmosis unit for water purification purposes located at a place of use of the purified water is recycled by returning the water to the incoming water line and mixing it with the incoming water. Since such incoming water is usually used for washing, toilet flushing and other non consumption purposes, the resulting increase in particulate matter is not of importance. In variants of the invention, the pressure across the membrane of the reverse osmosis unit, after water flow thereto has ceased, is released to preserve the life of the membrane by channeling a small amount of water to a drain, a container or the inflowing water line at the place of use. Periodically, the upstream side of the reverse osmosis unit may be flushed.

It is therefore a primary object of the present invention to reuse the non filtered water discharged from a reverse osmosis unit.

Another object of the present invention is to provide apparatus for conveying water past the upstream side of a membrane of a reverse osmosis unit into the water line entering the place of use of the reverse osmosis unit.

Yet another object of the present invention is to provide apparatus for flushing the upstream side of the membrane of a reverse osmosis unit.

Still another object of the present invention is to provide apparatus for relieving the pressure differential across the membrane of a reverse osmosis unit during non actuation of the unit.

A further object of the present invention is to essentially eliminate wasted water during use of a reverse osmosis unit.

A yet further object of the present invention is to provide potable water from a reverse osmosis unit without wasting a significant amount of water.

A still further object of the present invention is to provide a method for essentially eliminating wasting of water during use of a reverse osmosis unit to obtain potable water.

These and other objects of the present invention will become apparent to those skilled in the art as the description herein proceeds.

BRIEF DESCRIPTION OF THE DRAWINGS

The present invention will be described with greater specificity and clarity with reference to the following drawings, in which.

DETAILED DESCRIPTION OF THE PREFERRED EMBODIMENT

Figure 1:
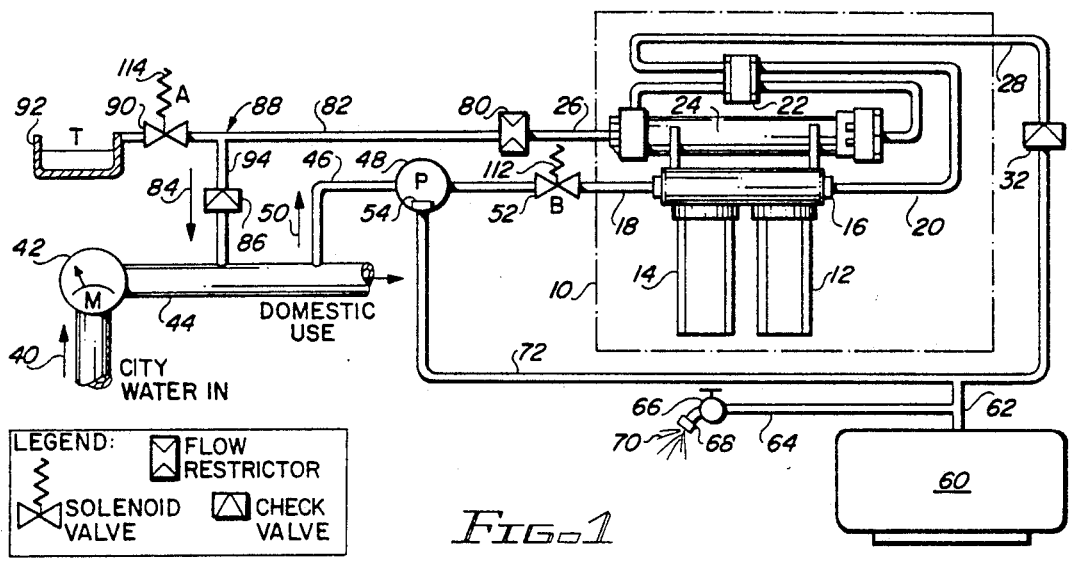
FIG. 1 illustrates the flow diagram of apparatus for reusing the water discharged from a reverse osmosis unit.

Referring to FIG. 1, there is illustrated within a dashed line a representation of a conventional reverse osmosis unit 10. This unit includes a pair of filters 12,14 for filtering particulate matter in water flowing into manifold 16 through inlet conduit 18. Outlet conduit 20 conveys the prefiltered water through shutoff valve 22 to the upstream side of a membrane housed within canister 24. The concentrate, the term used in the industry to identify the water containing particles and other products remaining on the upstream side of the membrane, is exhausted from canister 24 through conduit 26. The permeate, a term referred to as the water filtered through the membrane within canister 24, is conveyed through conduit 28 via a check valve 32.

A source 40 of city water is conveyed through a meter 42 to water line 44 entering a business or residence. To obtain potable water without the impurities contained in most city supplied water, a water pipe 46 interconnects water line 44 with the input side of a pressure responsive pump 48. Flow to the pump is depicted by arrow 50. The pump, when operating, pumps the received water through valve 52 to inlet conduit 18 of the reverse osmosis (R/O) unit 10.

The permeate from the R/O unit is conveyed through conduit 28 to a container 60 via a T-fitting 62. T-fitting 62 includes a discharge pipe 64 which may include a valve 66 for controlling flow of potable water through spout 68. The outflow of water is depicted by dots 70. A pressure line 72 pneumatically interconnects the interior of container 60 with pressure sensor 54 depicted as part of pump 48. The pressure sensor controls operation of the pump and will energize the pump when the pressure sensed drops below a predetermined value. Accordingly, pump 48 will operate periodically to maintain a certain pressure within container 60, which pressure is reflective of the amount of potable water contained therein.

Normally, the concentrate, or waste water, is discharged from R/O unit 10 through a discharge conduit into a sewage system serving the business or residence. Since a conventional R/O unit produces two to three times as much waste water as potable water, the quantity of water wasted may be very significant over a period of time. The apparatus to be described below will avoid this waste.

A flow restrictor 80 is in line with conduit 26. This flow restrictor will establish and maintain a pressure on the upstream side of the membrane within canister 24 to ensure water flow through the membrane. The water from restrictor 80 is conveyed through conduits 82 and 94 and into water line 44, as depicted by arrow 84. To prevent reverse flow from water line 44, a check valve 86 is incorporated in conduit 94. A T-connection 88 interconnects conduit 82 with a valve 90, which valve controls flow into a receiver or basin 92.

Figure 2:
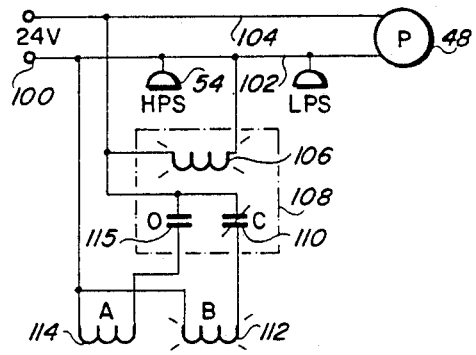
FIG. 2 illustrates a first state of the electrical circuit attendant the apparatus shown in FIG. 1.
Figure 3:
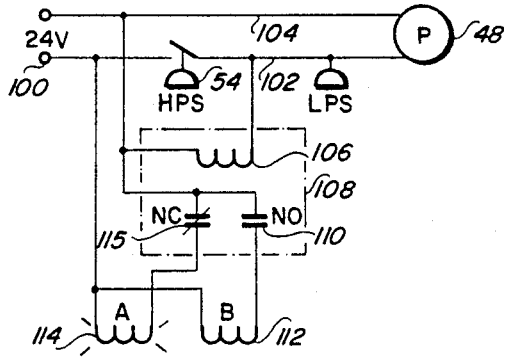
FIG. 3 illustrates a second state of the electrical circuit attendant the apparatus shown in FIG. 1.

The operation of valves 52 and 90 will be described with joint reference to FIGS. 1, 2 and 3. When pressure sensor 54 (high pressure sensor - HPS) is closed, electrical power is applied from source 100 to pump 48 via electrical conductors 102,104. Simultaneously, relay 106 of function switch 108 is energized resulting in normally open relay 110 closing to provide power to solenoid 112 of valve 52. When valve 52 is actuated, along with energization of pump 48, water will flow into the R/O unit and potable water will be produced. When the pressure within container 60 reaches a predetermined value indicative of fill of the container to a predetermined level, pressure sensor 54 will open to terminate flow of electrical power to pump 48 and the pump will shut off. Solenoid 106 will become de-energized and relay 110 reverts to its normally open state; simultaneously, relay 115 reverts to its normally closed state. The opening of relay 110 will de-energize valve 52 and it will close. Simultaneously, solenoid 114 of valve 90 will be energized and the valve will be opened. The opening of valve 90 will relieve the pressure on the upstream side of the membrane within canister 24 and permit the pressure across the membrane to equalize. A small quantity (a matter of ounces) of water will be discharged into basin 90. After discharge of potable water 70 through spout 68 by opening valve 66, the potable water within container 60 will be partially depleted. Upon such depletion, the pressure sensed by sensor 54 will drop below a predetermined threshold. Thereafter, pump 48 will be energized and the cycle will be repeated.

Figure 4:
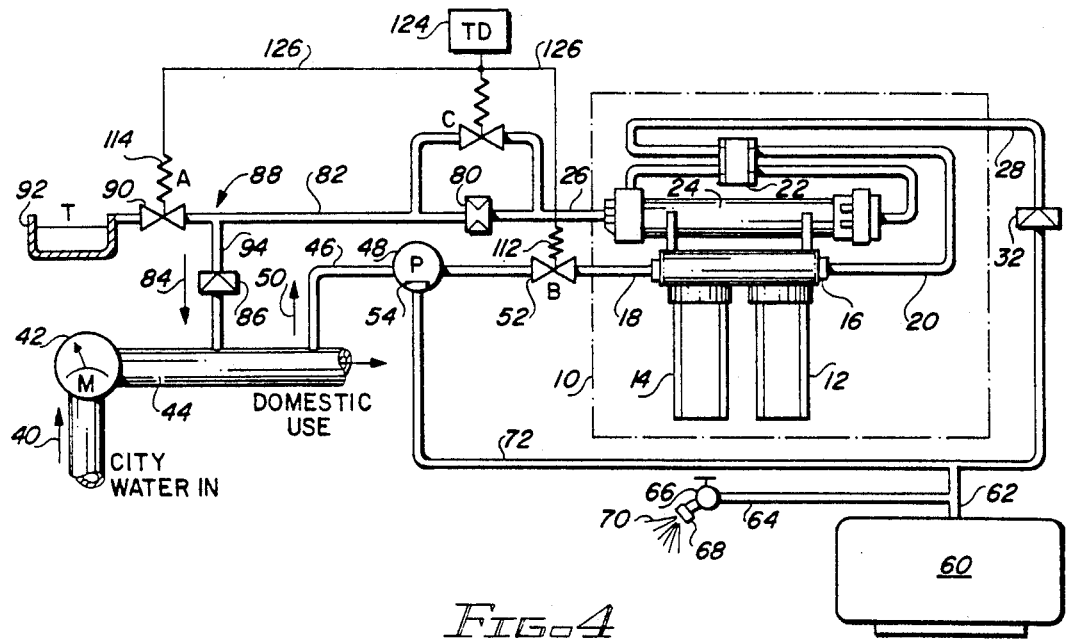
FIG. 4 illustrates a flow path for flushing the apparatus shown in FIG. 1.

FIG. 4 illustrates apparatus very similar to that shown in FIG. 1 except for one significant difference. It includes apparatus for flushing R/O unit 10 after each actuation of pump 48. A bypass conduit 120 interconnects conduits 26 and 82 on opposed sides of restrictor 80. A valve 122 is disposed in bypass conduit 120. A time delay circuit 124 is associated with each of solenoids 112,114 and 123 of valves 52, 90 and 122, respectively, via representative conductor 126. The remaining components illustrated in FIG. 4 correspond with those illustrated and described with respect to FIG. 1.

In response to a low pressure within container 60, sensed by sensor 54, pump 48 will be actuated. Simultaneously, time delay circuit 124 will generate a signal to energize solenoid 112 and open valve 52 and to energize solenoid 123 to open valve 122. With both of these valves open, no back pressure will occur within canister 24 of R/O unit 10 upstream of the membrane and the associated flow path will be flushed. After a predetermined time period, the time delay circuit will de-energize solenoid 123 and valve 122 will close. Upon closure, further outflow from the R/O unit will be through restrictor 80, as described above with respect to FIG. 1. After the R/O unit has produced a quantity of permeate and operation ceases as a result of de-energization of pump 48, the pressure may be relieved. To relieve the pressure, solenoid 114 will be energized to open valve 90 and permit relieving of the pressure across the membrane within canister 24. This variant provides the capability for periodically flushing the concentrate, containing particulate matter, from within the R/O unit and returning the concentrate to water line 44.

Figure 5:
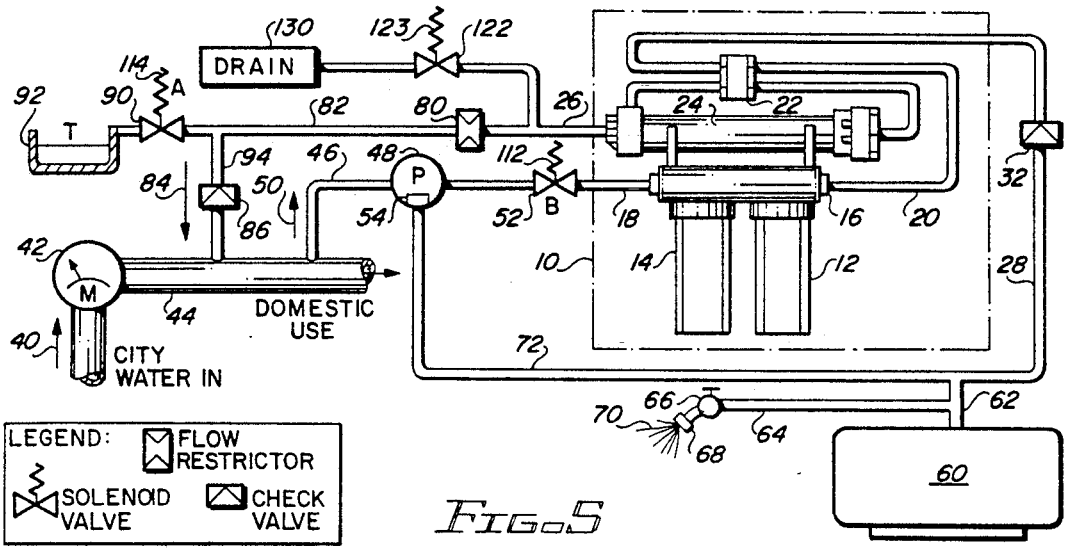
FIG. 5 illustrates a variant of the apparatus shown in FIG. 4.

Referring to FIG. 5, there is illustrated a variant of the apparatus shown in FIG. 4 More particularly, the main difference between apparatus shown in FIGS. 4 and 5 is the outflow from valve 122. In the apparatus shown in FIG. 4, the outflow from valve 122 is returned to conduit 82. In the apparatus shown in FIG. 5, the outflow from valve 122 is directed through conduit 128 into a drain or sewage system 130. Thereby, the particulate matter flushed from R/O unit 10 is discharged into the drain as waste water and is not returned to water line 44.

The electrical circuit corresponding with the apparatus shown in FIGS. 4 and 5 can be derived by one skilled in the art from inspection of FIGS. 2, 3, 8, 9, 13, 14 or 15.

Figure 6:
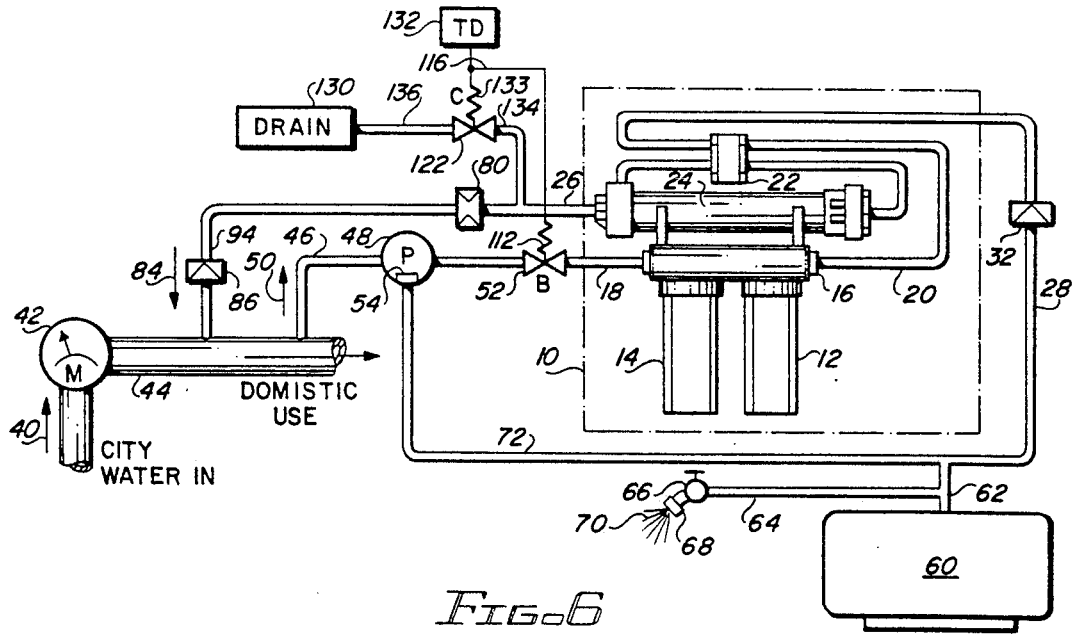
FIG. 6 illustrates a variant of the apparatus shown in FIG. 5.

FIG. 6 illustrates apparatus very similar to that shown in FIG. 5 with the main difference being the inclusion of a time delay circuit 132 interconnected with and energizing solenoid 112 of valve 52 and solenoid 127 of valve 122. Upon deactuation of pump 42 resulting from the sensing by sensor 54 of a high pressure environment within container 60, time delay circuit 132 de-energizes through electrical conductor 116 solenoid 112 to close valve 52. Simultaneously, solenoid 123 of valve 122 is energized through electrical conductor 116 to open the valve. Any pressure present within canister 24 on the upstream side of the membrane therein will result in flow through conduit 26 and conduit 134, through valve 122 and into drain 130 through discharge conduit 136. Such flow will relieve the pressure within canister 24 on the upstream side of the membrane within R/O unit 10 and further permeation of water through the membrane will not occur.

Figure 8:
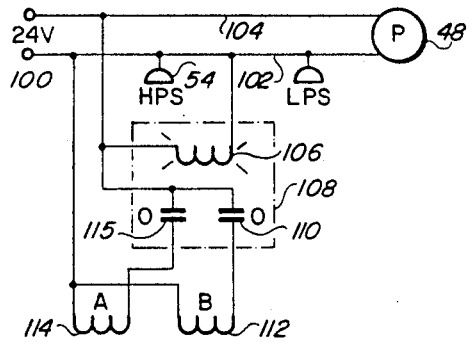
FIG. 8 illustrates the first state of an electrical circuit attendant the apparatus shown in FIG. 7.
Figure 7:
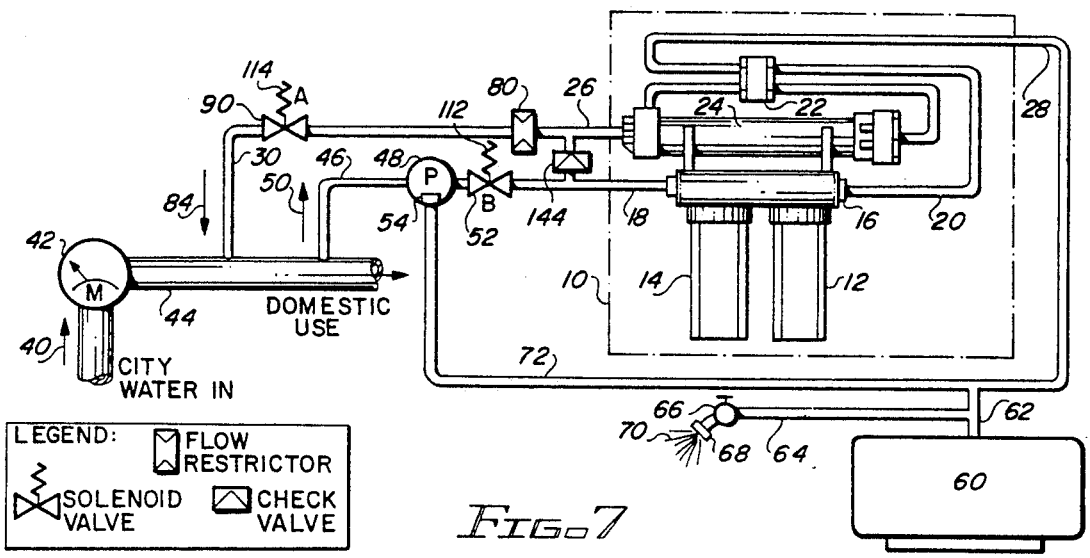
FIG. 7 illustrates an alternate water discharge path from the reverse osmosis unit over that shown in FIG. 1.
Figure 13:
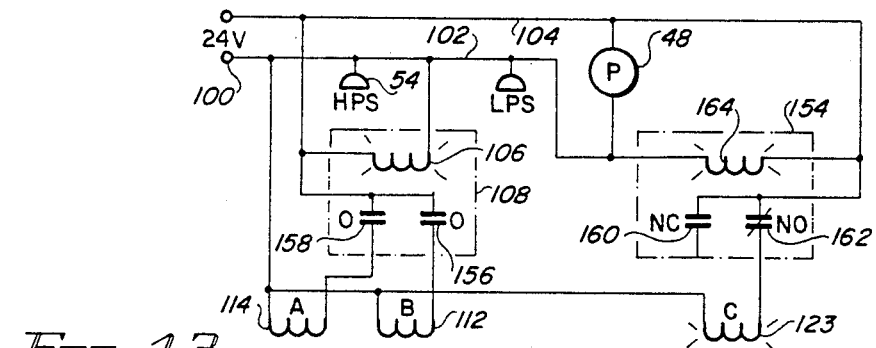
FIGS. 13, 14 and 15 illustrate three states of an electrical circuit adaptable for use with the apparatus shown in any of FIGS. 10, 11 or 12.

Referring to FIG. 7, there is shown an R/O unit 10 similar to that described above for providing potable water to container 60. The main difference relates to the flow path of the concentrate from the R/O unit. Details of the operation will be described with joint reference to FIGS. 7, 8 and 9. When high pressure sensor 54 senses a pressure in line 72, reflective of the pressure within container 60, which is below a predetermined value, pump 48 is energized, as depicted in FIG. 8. Simultaneously, coil 106 of function switch 108 is energized and normally closed relays 110,115 open. The open relays will preclude energization of solenoids 112,114 and valves 52,90 will remain open. Water will be drawn from water line 44 through water pipe 46, as depicted by arrow 50, and channeled into manifold 16 of R/O unit 10 via inlet conduit 18. Permeate from the R/O unit will flow through conduit 28 into container 60 wherein pressure will build. Simultaneously, the concentrate, or waste water from the R/O unit, will flow through conduit 26, restrictor 80, valve 90 and into water line 44, as depicted by arrow 84. It may be pointed out that the purpose for restrictor 80 is that of maintaining a high pressure on the upstream side of the membrane within canister 24 to assure permeation of water therethrough.

Figure 9:
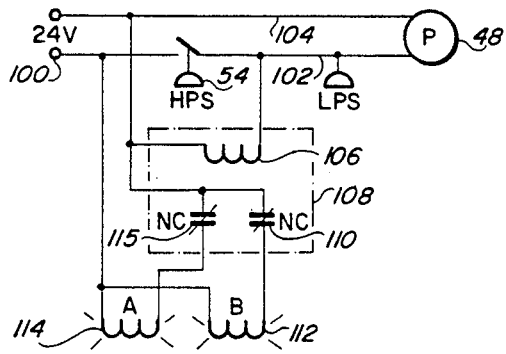
FIG. 9 illustrates a second state of the electrical circuit attendant the apparatus shown in FIG. 7.

When the pressure within container 60 has reached a predetermined value, pressure sensor switch 54 will open, as depicted in FIG. 9. Electrical power from source 100 will no longer be applied to pump 48 and the pump will stop. Simultaneously, solenoid 106 will be de-energized and relays 110,115 will revert to their normally closed state. Upon closing of these relays, power will be applied to solenoids 112,114 to close valves 52,90. Upon closure of these valves, there will exist a pressure differential between inlet conduit 18 and conduit 26, with the higher pressure being present in conduit 26. This pressure is relieved by flow through check valve 144. Accordingly, any pressure discontinuities or variations in the high pressure hydraulic system attendant the R/O unit will be relieved. Moreover, the pressure differential across the membrane within canister 24 will be equalized by commensurate water flow therethrough.

Figure 10:
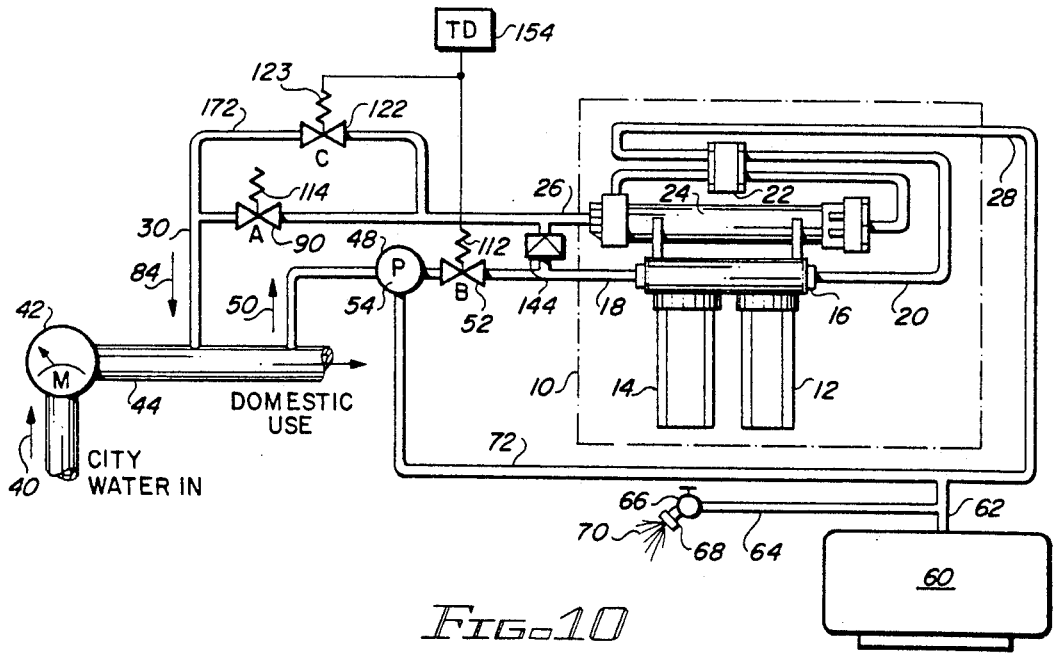
FIG. 10 illustrates a variant flow path for flushing the apparatus shown in FIG. 7.
Figure 14:
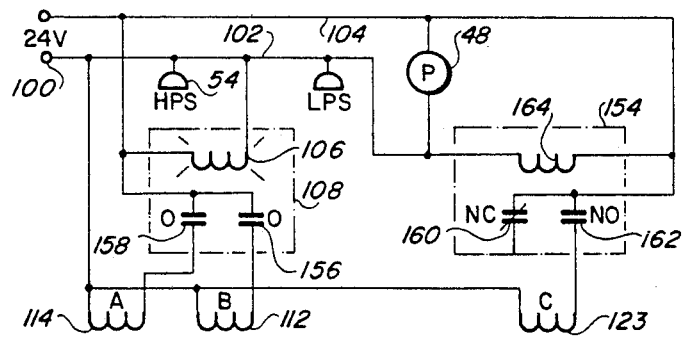

FIG. 10 illustrates a system similar to that shown in FIG. 7 but having a flushing loop added thereto. The apparatus shown in FIG. 10 will be described in detail with joint reference to electrical schematics illustrated in FIGS. 13, 14 and 15. When pressure sensor switch 54 senses a low pressure condition, pump 48 is energized by electrical power source 100. Simultaneously, solenoid 106 of function switch 108 is energized and relay 156 is opened to de-energize solenoid 112 to open valve 52. Furthermore, solenoid 164 of time delay relay 154 is energized resulting in closure of relay 162 and opening of relay 160. The closing of relay 162 energizes solenoid 123 and valve 122 opens. Outflow of concentrate from R/O unit 10 will flow through conduit 26, conduit 170, through valve 122 and conduit 172 to conduit 30 for return to water line 44 due to the flow restrictive function of restrictor 80. Because this return water flow is not restricted, little pressure buildup will occur within canister 24 and water flow through the membrane disposed therein will be limited. Because of the lack of flow restriction, relatively rapid water flow will be present and it will serve the function of flushing the concentrate and particulates disposed upstream of the membrane. That is, a cleaning function is performed. After time delay relay 154 reaches the end of a preset time, solenoid 164 is de-energized and relay 162 will resume its normally open condition and current through solenoid 123 will cease. De-energization of solenoid 123 will result in closing of valve 122. Thereby, the flushing operation will cease. The corresponding state of the electrical circuit is depicted in FIG. 14.

Figure 15:
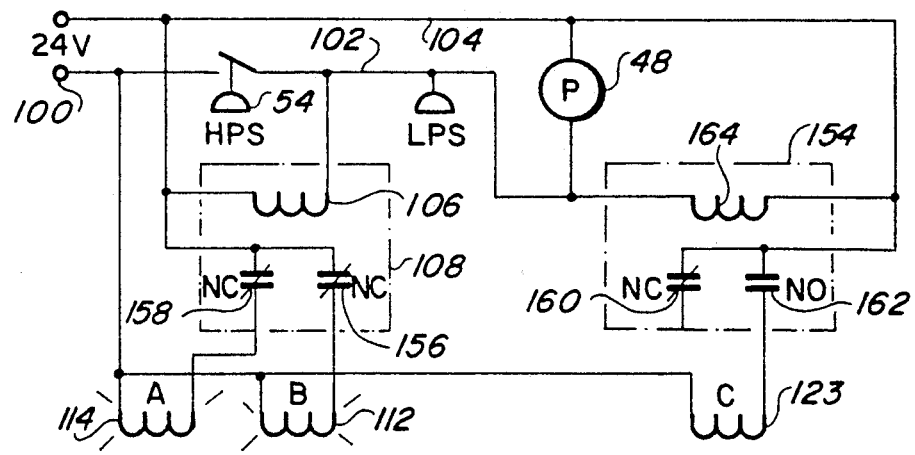

With pump 48 running, the outflow through conduit 26 will flow through restrictor 80 and valve 90 (since it is normally open). The water flow will continue from valve 90 through conduit 30 for return into water line 44, as depicted by arrow 84. After container 60 has reached a predetermined pressure, pressure sensor switch 54 will open, as depicted in FIG. 15, and pump 48 will be shut off. Simultaneously, solenoid 106 of function switch 108 will be de-energized and relay 158 will revert to its normally closed state; thereby, solenoid 114 of valve 90 is energized. Upon energization of solenoid 114, valve 90 will close and flow through conduit 30 into water line 44 will cease. Simultaneously, closing of relay 156 will energize solenoid 112 and valve 52 will close. Any existing pressure differential between conduits 18 and 26 will be relieved by flow through check valve 144.

Figure 11:
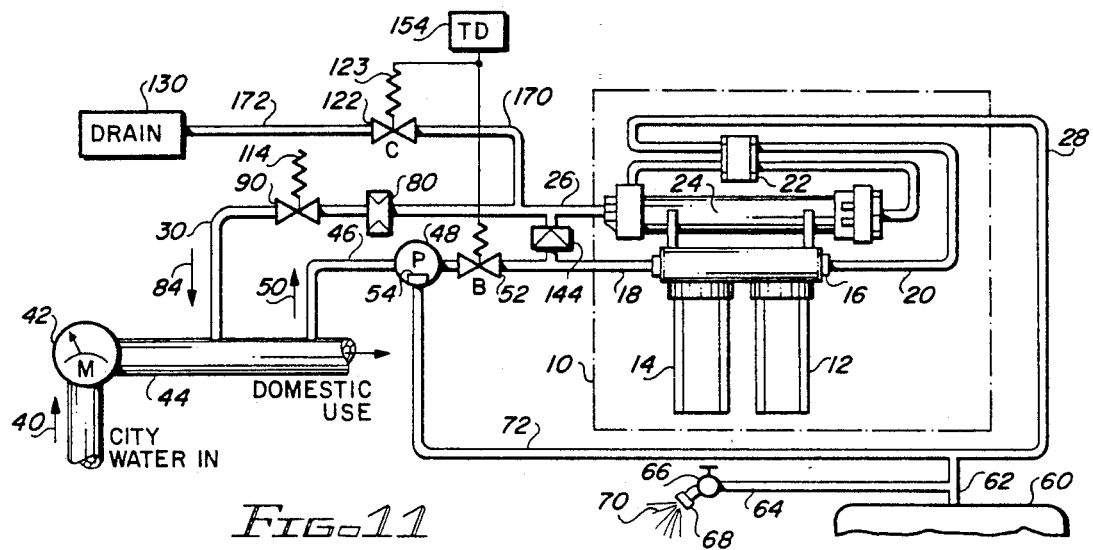
FIG. 11 illustrates a variant of the apparatus shown in FIG. 10.

FIG. 11 illustrates apparatus and a hydraulic system similar to that shown in FIG. 10 with one major difference. The outflow from valve 122 during the flushing operation is channeled through conduit 172 to a drain 130 or sewage system instead of being returned to water line 44. Such channeling may be required by municipal codes or other regulations.

Figure 12:
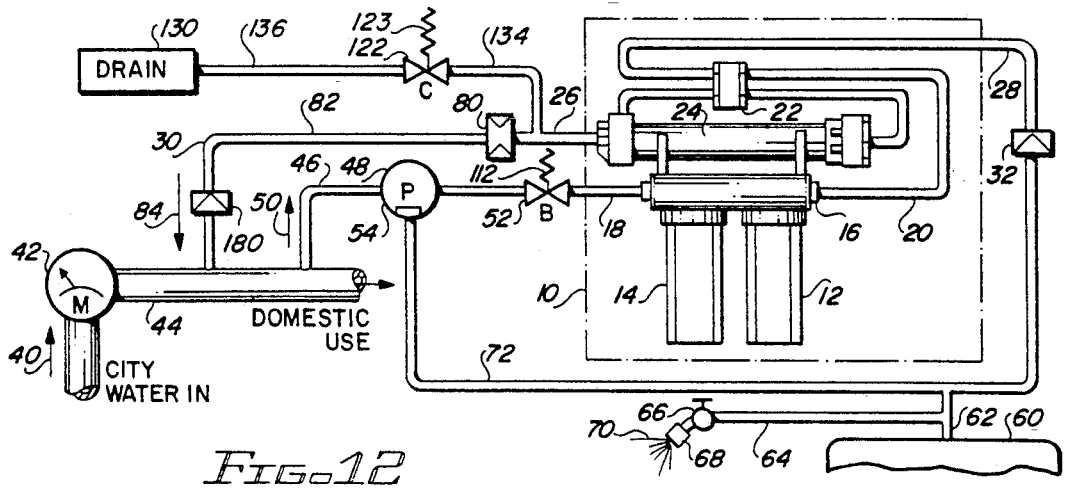
FIG. 12 illustrates a variant if the apparatus shown in FIG. 11.

The apparatus illustrated in FIG. 12 is similar to that shown in FIG. 11 except that it does not include a flushing feature and it includes a different type of flow control apparatus for relieving pressure on the upstream side of the membrane within canister 24 after pump 48 ceases to operate. Conduit 30 downstream of restrictor 80 does not include a valve to inhibit flow therethrough on cessation of operation of pump 48. Instead, a check valve 80 is employed to insure flow through conduit 30 remains in the direction depicted by arrow 84. Thus, when valve 52 closes on cessation of operation of pump 48 in response to attainment of a predetermined high pressure in container 60, further flow into R/O unit 10 ceases. However, because of restrictor 80, a pressure attendant the high pressure side of the membrane within canister 24 will exist, unless relieved. Simultaneous with closing of valve 52 through deenergization of solenoid 112, solenoid 123 will be energized and valve 122 will open. Thereby, pressure relief is provided by flow through conduit 136, valve 122, conduit 136 and into drain 130. The quantity of flow is usually a matter of a few ounces. After a period of time, the pressure will be relieved. Moreover, the pressure across the membrane within canister 24 will be equalized by water flow therethrough.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

We claim:

1. Apparatus for conserving water during production of potable water from a source of water by a reverse osmosis unit, said apparatus comprising in combination:
   a) means for conveying water from the source of water under a first pressure greater than ambient pressure;
   b) a pump for increasing the pressure of the water conveyed by said conveying means to a second pressure, which second pressure is greater than the first pressure;
   c) further means for conveying the water from said pump to the reverse osmosis unit;
   d) means for channeling potable water from the reverse osmosis unit to a container;
   e) further means for channeling waste water from the reverse osmosis unit;
   f) means for maintaining the pressure of the waste water in said further channeling means at a pressure between the first and the second pressures as a function of the pressure losses in the reverse osmosis unit; and
   g) means for returning the waste water from said further channeling means to the source of water in response to the pressure differential between the first pressure of the source of water and the pressure of the waste water.

2. The apparatus as set forth in claim 1 including means for relieving the pressure on the retentate side of the membrane disposed within the reverse osmosis unit upon cessation of operation of the reverse osmosis unit.

3. The apparatus as set forth in claim 2 wherein said relieving means includes a basin for receiving waste water from the reverse osmosis unit.

4. The apparatus as set forth in claim 1 including means for flushing the reverse osmosis unit with water from the source of water for a period of time prior to production of potable water.

5. The apparatus as set forth in claim 4 wherein said returning means includes means for directing to the source of water the water used to flush the reverse osmosis unit.

6. The apparatus as set forth in claim 5 including means for relieving the pressure on the retentate side of the membrane disposed within the reverse osmosis unit after fill of the container to a predetermined permeate flow pressure.

7. The apparatus as set forth in claim 4 including means for directing to a drain the water used to flush the reverse osmosis unit.

8. The apparatus as set forth in claim 7 including means for relieving the pressure on the retentate side of the membrane disposed within the reverse osmosis unit upon cessation of operation of the reverse osmosis unit.

9. The apparatus as set forth in claim 8 wherein said relieving means includes a basin for receiving waste water from the reverse osmosis unit.

10. The apparatus as set forth in claim 1 including means responsive to the pressure of potable water in the container for regulating operation of said pump.

11. The apparatus as set forth in claim 1 including means for preventing flow of water from the source of water through said further channeling means.

12. The apparatus as set forth in claim 1 including means for flushing the reverse osmosis unit with water from the source of water for a period of time subsequent to production of potable water.

13. The apparatus as set forth in claim 12 wherein said returning means includes means for directing to the source of water the water used to flush the reverse osmosis unit.

14. The apparatus as set forth in claim 13 including means for relieving the pressure on the retentate side of the membrane disposed within the reverse osmosis unit after fill of the container to a predetermined pressure.

15. The apparatus as set forth in claim 12 including means for directing to a drain the water used to flush the reverse osmosis unit.

16. The apparatus as set forth in claim 15 including means for relieving the pressure on the membrane disposed within the reverse osmosis unit upon cessation of operation of the reverse osmosis unit.

17. A method for conserving water during production of potable water from a source of water by a reverse osmosis unit, said method comprising the steps of:
   a) conveying water from the source of water under a first pressure greater than ambient pressure;
   b) increasing by operation of a pump the pressure of the water conveyed during said step of conveying to a second pressure, which second pressure is greater than the first pressure;
   c) further conveying the water from the pump to the reverse osmosis unit;
   d) channeling potable water from the reverse osmosis unit to a container;
   e) further channeling waste water from the reverse osmosis unit;
   f) maintaining the pressure of the waste water during said step of further channeling at a pressure between the first and second pressures as a function of the pressure losses in the reverse osmosis unit; and
   g) returning the waste water channeled during said step of further channeling to the source of water in response to the pressure differential between the first pressure of the source of water and the pressure of the returned waste water.

18. The method as set forth in claim 17 including the step of flushing the reverse osmosis unit with water from the source of water.

19. The method as set forth in claim 18 wherein said step of flushing is carried out prior to production of potable water.

20. The method as set forth in claim 18 wherein said step of flushing is carried out subsequent to production of potable water.

21. The method as set forth in claim 18 including the step of directing the flush water resulting from carrying out said step of flushing to the source of water.

22. The method as set forth in claim 18 including the step of directing the flush water resulting from carrying out said step of flushing to a drain.

23. The method as set forth in claim 17 including the step of relieving pressure on the retentate side of the membrane disposed within the reverse osmosis unit upon cessation of operation of the reverse osmosis unit.

* * * * *